April 27, 1926.

Re. 16,335

A. H. LEVENE

TOTE BOX

Original Filed Sept. 24, 1919 2 Sheets-Sheet 1

ON LINE 3-3. FIG. 2.

INVENTOR:
Albert H. Levene,
BY
Niederheim & Fainbank
ATTORNEYS.

April 27, 1926. Re. 16,335

A. H. LEVENE

TOTE BOX

Original Filed Sept. 24, 1919 2 Sheets-Sheet 2

ON LINE 4-4, FIG. 3.

ON LINE 5-5, FIG. 4.

ON LINE 7-7, FIG. 8.

ON LINE 8-8, FIG. 7.

INVENTOR:
Albert H. Levene,
BY
Niederheim & Fairbanks
ATTORNEYS.

Reissued Apr. 27, 1926.

Re. 16,335

UNITED STATES PATENT OFFICE.

ALBERT H. LEVENE, OF NEWARK, NEW JERSEY.

TOTE BOX.

Original No. 1,336,972, dated April 13, 1920, Serial No. 325,922, filed September 24, 1919. Application for reissue filed May 22, 1922. Serial No. 562,841.

*To all whom it may concern:*

Be it known that I, ALBERT H. LEVENE, a citizen of the United States, residing in the city of Newark, county of Essex, State of New Jersey, have invented a new and useful Tote Box, of which the following is a specification.

My present invention comprehends a novel construction of a tote box which is constructed in such a manner that it may be readily stacked.

It further comprehends a novel construction of a tote box wherein the top is open and unobstructed and a front delivery and replenishing opening is provided having a novel construction and arrangement of a door which when dropped to closed position will automatically lock and when the door is raised to its open position it can be moved into the box in order that the replenishing and delivery opening is accessible to the operator.

It further consists of a novel construction of a box of the character specified which is braced and reinforced in a novel manner.

Other novel features of construction and advantage will hereinafter more clearly appear in the detailed description of my invention.

For the purpose of illustrating my invention, I have shown in the accompanying drawings typical embodiments thereof which are at present preferred by me, since said embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts.

Figure 1:
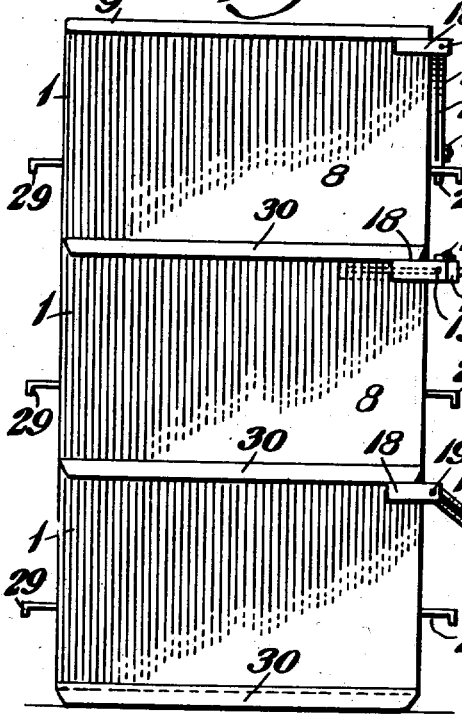
Figure 1 represents, in side elevation, a plurality of tote boxes, embodying my invention, the boxes being shown stacked one above the other.

Referring to the drawings.

Figure 3:
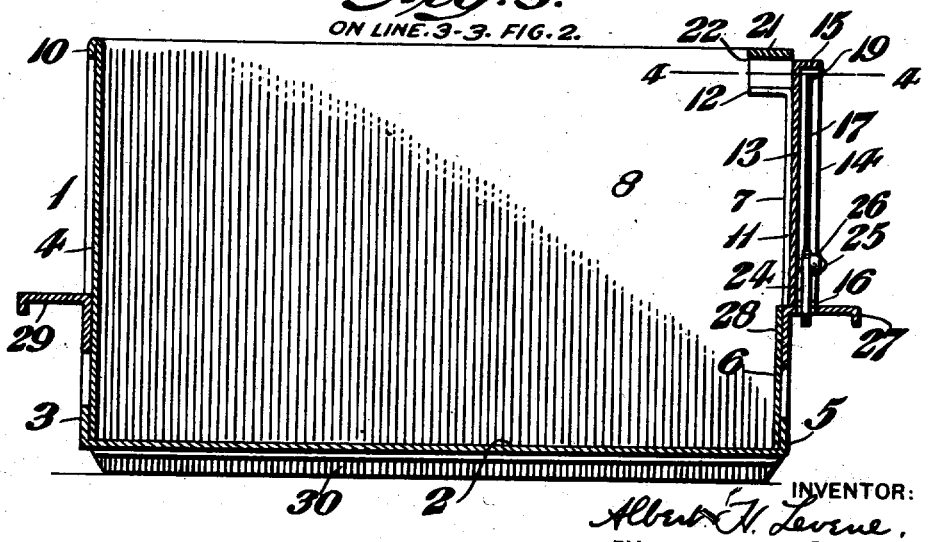
Figure 3 represents a section on line 3—3 of Figure 2.
Figure 4:
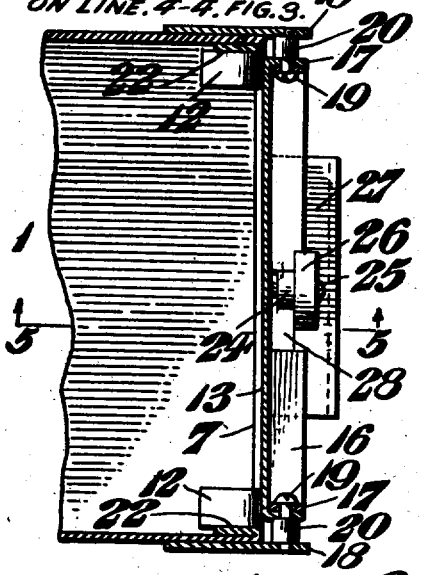
Figure 4 represents a section on line 4—4 of Figure 3.

1 designates a tote box embodying my invention. The bottom 2 of the tote box is provided at its inner end with upwardly extending flanges 3 secured to the rear wall 4 in any desired manner. The bottom 2 is also provided with a flange 5 secured to the front wall or plate 6 which latter terminates a desired distance above the bottom in order to form a replenishing and filling opening 7. The side walls or plates 8 are connected together in the usual manner and at their upper or free ends they are bent over to form reinforcing flanges 9. The rear plate 4 is also bent over to form the reinforcing flanges 10, see Figure 3. The side plates 8 at their forward ends are bent over to form the flanges 11 which overlap the front plate 6 and are secured thereto in any desired manner. The flanges 11 at their upper ends are laterally and inwardly deflected as at 12 to form a support and guide for the door 13. The door 13 is pan shaped and comprises a plate having the outwardly extending side flanges 14, the top flange 15, the bottom flange 16. The side flanges 14 are provided with the longitudinally extending slots 17, see more particularly Figures 1, 3 and 5.

The sides 8 of the tote box have secured to them in any desired manner, for example by welding or riveting, the arms 18. 19 designates fastening devices such as, for example screws, which pass through the slots 17 and through the tubular spacing members 20 and are in threaded engagement with the arms 18. The top of the tote box is open and unobstructed and at its forward end it is reinforced by means of a reinforcing member 21 the ends of which are deflected downwardly, as at 22, and secured in any desired manner to the sides of the tote box. This reinforcing member 21 preferably consists of a flat metal bar.

Figure 5:
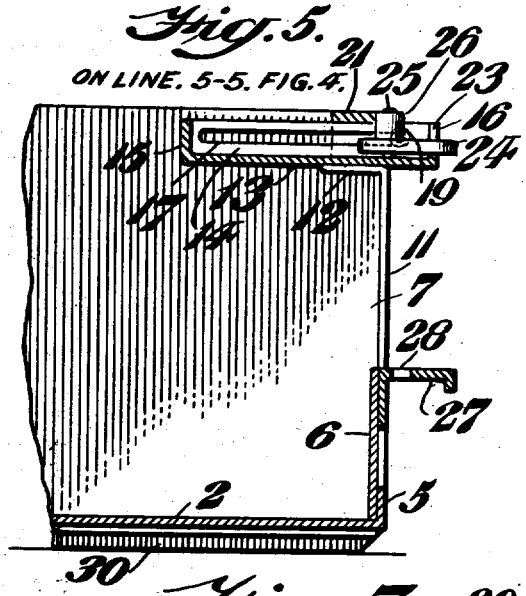
Figure 5 represents a section on line 5—5 of Figure 4.
Figure 6:
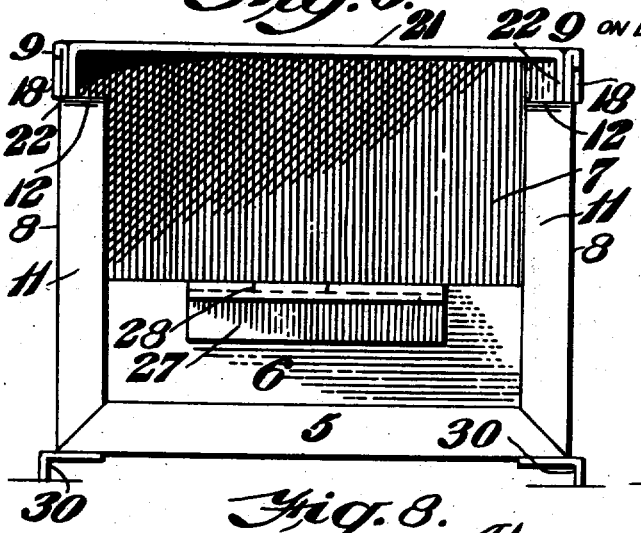
Figure 6 represents, in front elevation, a tote box embodying my invention, with the door removed.

The reinforcing member 21 also contributes to form a guide for the door and the side flanges 14 are accurately guided between the reinforcing member 21 and the inwardly extending flanges 12 of the tote box, so that when the door is moved inwardly it will be retained in the position seen in Figure 5.

The bottom flange 16 of the door is slotted or recessed, as indicated at 23, in order to permit the hook 24 to pass through it. This hook 24 is pivotally mounted at 25 on the door and is provided with a grasping handle 26. The front plate 6 has secured to it near its upper end a grasping handle 27 which is slotted as indicated at 28 in order that the hook 24 may pass through such slot and interlock with a wall of it to retain the door 13 in its closed and locked condition. The grasping handle 27 consists of an angle secured to the front plate 6 and the rear plate 4 of the door has secured to it a grasping handle 29 preferably of the same construction except that the slot 28 is omitted.

Figure 2:
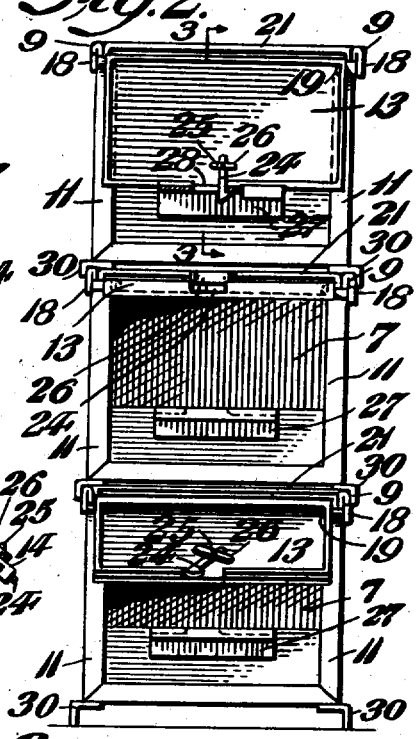
Figure 2 represents, in front elevation, a plurality of tote boxes in stacked relationship with each other, the doors of the different boxes being shown in different positions.

The door 13 when closed overlaps the front flanges 11, as will be understood from Figure 2. The bottom plate has secured to it in any desired manner the angle 30 which forms runners and the downwardly extending flanges of these runners when the boxes are sacked overhang the reinforcing flanges 9 at the side of the tote box, so that the tote boxes are accurately aligned when placed one above the other.

Figure 7:
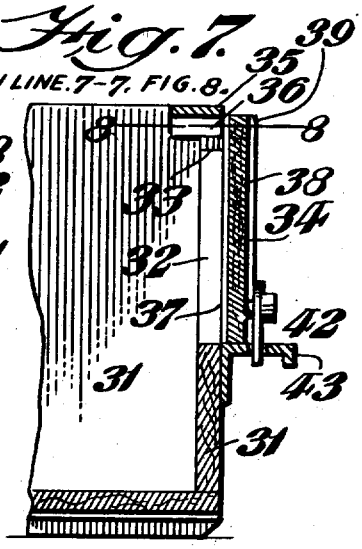
Figure 7 represents a section on line 7—7 of Figure 8, of another embodiment of my invention, showing the manner in which it is carried out in practice when the tote box is made of wood instead of metal.
Figure 8:
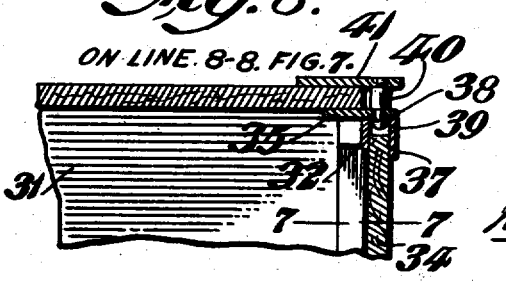
Figure 8 represents a section on line 8—8 of Figure 7.

In the contruction above described, the parts of the box are made of metal plates and in case it is desirable a wooden box or a box of other material may also be constructed in accordance with my invention, as will be understood by reference to Figures 7 and 8, in which 31 designates a tote box having the same formation as already described and consists of a rectangular shaped box having an open top and having a front wall terminating a desired distance above the box to form a replenishing and delivery opening 32, while at its sides at the front end, it extends upwardly and terminates at 33, in order to form a guide for the door 34. A reinforcing bar 35 is secured to the sides across the top and preferably consists of a flat bar or board or a metal bar having downwardly extending flanges 36 secured to the sides of the tote box and serving as a reinforcement, as a guide for the doors 34 when moved inwardly and also limiting the movement of such doors. The sides of the door 34 have secured to them in any desired manner the U-shaped plate 37 having the longitudinally extending slot 38 through which pass fastening devices 39 which also pass through tubular spacing members 40 and are fixed to the plates 41 secured to or forming a part of the sides of the tote box.

The locking device 42 employed is constructed and operated in a similar manner to the locking device 24 and its adjuncts and this interlocks with the grasping handle 43, constructed and arranged with respect to the box in the same manner as the grasping handle 27.

It will now be apparent to those skilled in this art that the tote box can be placed in shelving in the usual manner or can be stacked one above the other without the necessity of employing any shelving. When the boxes are stacked, or in fact, at any other time, the material stored in the boxes can be removed by unlocking the front door 13, raising it and moving it into the tote box, so that the replenishing and delivery opening 7 is free and unobstructed. When the door is closed, the hook 24 is weighted so that it will automatically fall into locking position due to gravity and its own weight, it being seen that one face of the hook is beveled in order that such action will take place.

It will also be seen that when the tote box is full and carried around the articles will not be spilled from it through the replenishing and delivery opening 7 and the material can be readily removed through the open and unobstructed top.

The reinforcing bar or member serves to limit the inward movement of the door and the handle will prevent the door being moved into the tote box too far as will also the length of the slot 17.

It will be apparent to those skilled in the art that in accordance with my present invention, I have devised a novel construction of tote box wherein the top is open and unobstructed and a portion of the front face is removed to form a front delivery opening when the boxes are stacked.

The boxes are reinforced by means of reinforcing members extending across the box at the front and connected with the sides so that the boxes will have sufficient rigidity to enable them to be stacked one above the other.

It is within the scope of my invention to employ tote boxes of this construction either with or without doors since if the boxes were assembled in a rack or shelving the articles stored therein can be removed through the front delivery opening.

It will now be apparent that I have devised a new and useful construction of a tote box which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or or scope of the invention or sacrificing any of its advantages.

Having thus described my invention, what I claim as new and desire to secure by Letters Patent, is:—

1. A tote box having sides, a bottom, ends, and an open and unobstructed top, stacking means operatively connected with said box, one of said ends having a cutaway portion to form a front replenishing and delivery opening when the box is stacked, the remaining fixed portion of such end preventing articles falling out of the box when it is being carried around, and a reinforcing member at the upper front end of said box and connected to its sides.

2. A tote box having sides, a bottom, ends and an open and unobstructed top, stacking means operatively connected with said box, one of said ends having a cut-away portion to form a front replenishing and delivery opening when the box is stacked, the remaining fixed portion of such end preventing articles falling out of the box when it is being carried around, a reinforcing member at the upper front end of said box and connected to its sides, and a door movably carried by said box and controlling said opening.

3. A tote box having a bottom, sides, ends, and an open and unobstructed top and having one of its ends cut away to form an opening provided with vertically directed side flanges extending laterally to partially cover said opening to assist in preventing material stored in the box being discharged through said opening, and stacking means operatively connected with said box.

4. A tote box having a bottom, sides, ends, and an open and unobstructed top and having the front end cut away a desired distance from the bottom to form a front delivery opening, and vertically directed side flanges on opposite sides of said opening and partially covering it, stacking means operatively connected with said box, and a door carried by said box and having its inward movement limited by said flanges.

5. A tote box having an open and unobstructed top and provided with a reinforcing member at the upper front edge of the box, and with a front replenishing and delivery opening below said reinforcing member, the front wall of said box, forming laterally extending side flanges which at their upper ends are inwardly deflected, stacking means operatively connected with said box, a door pivotally carried at the upper end of said box, and guided by said member, and the inwardly deflected portion of said front wall when such door is opened and moved into the box, and a locking device for said door.

6. A tote box having a bottom, sides, a rear wall and a front wall, the front wall being cut away to form a replenishing and delivery opening, and a fixed front portion, a door having longitudinally extending slots at its sides, fastening devices extending through said slots and operatively connected with the sides of said box, said box having means to guide said door when the latter is open and moved into it, stacking means operatively connected with said box, and a locking member carried by said door.

7. A tote box having an open and unobstructed top, a front replenishing and delivery opening, and a front wall, a grasping handle secured to said wall in proximity to said opening, stacking means operatively connected with said box, a door controlling said opening, and a locking device carried by said door and adapted to be interlocked with said grasping handle.

8. A tote box having an open and unobstructed top, a front replenishing and delivery opening, and a laterally extending door guide at the upper end of said opening, a door for said opening adapted to be moved into said box, a lock for said door to automatically lock it when the door is moved to closed position, and stacking means operatively connected with said box.

9. A tote box having a front opening and having its sides deflected to form front flanges which at their upper ends are laterally deflected, a reinforcing member extending across the top of the box and contributing with said deflected portions to form door guides, a door movably carried by said box to close said front opening and to move into said box between said guides when opened, and stacking means operatively connected with said box.

10. A tote box having a front opening and having its sides deflected to form front flanges which at their upper ends are laterally deflected, a reinforcing member extending across the top of the box and contributing with said deflected portions to form door guides, a door movably carried by said box to close said front opening and to move into said box between said guides when opened, a locking device to lock said door when in closed position, and stacking means operatively connected with said box.

11. A stacking tote box having its sides, bottom and one end constructed of sheet metal and having its top open and unobstructed, the other end forming a replenishing and delivery opening, stacking means operatively connected with said box, and a reinforcing member at the upper front end of said box and connected to the sides to give the box sufficient rigidity for stacking purposes.

12. A stacking tote box having its sides, bottom and one end constructed of sheet metal and having its top open and unobstructed, the other end forming a replenishing and delivery opening, stacking means operatively connected with said box, a reinforcing member connected with said box, and a door carried by said box and covering said opening and guided by said member when moved into said box to uncover said opening.

ALBERT H. LEVENE.